US010337080B2

(12) United States Patent
Fortunati

(10) Patent No.: US 10,337,080 B2
(45) Date of Patent: Jul. 2, 2019

(54) PROCESS FOR THE PRODUCTION OF GRAIN NON-ORIENTED ELECTRIC STEEL STRIP, WITH AN HIGH DEGREE OF COLD REDUCTION

(71) Applicant: CENTRO SVILUPPO MATERIALI S.P.A., Rome (IT)

(72) Inventor: Stefano Fortunati, Rome (IT)

(73) Assignee: CENTRO SVILUPPO MATERIALI S.P.A., Rome (IT)

( * ) Notice: Subject to any disclaimer, the term of this patent is extended or adjusted under 35 U.S.C. 154(b) by 424 days.

(21) Appl. No.: 15/306,242

(22) PCT Filed: May 7, 2015

(86) PCT No.: PCT/IB2015/053323
§ 371 (c)(1),
(2) Date: Oct. 24, 2016

(87) PCT Pub. No.: WO2015/170271
PCT Pub. Date: Nov. 12, 2015

(65) Prior Publication Data
US 2017/0044641 A1 Feb. 16, 2017

(30) Foreign Application Priority Data
May 8, 2014 (IT) ............... RM2014A0231

(51) Int. Cl.
*C21D 9/52* (2006.01)
*C21D 8/12* (2006.01)
*C22C 38/00* (2006.01)
*C22C 38/02* (2006.01)
*C22C 38/04* (2006.01)
*C22C 38/06* (2006.01)
*C22C 38/14* (2006.01)
*B22D 11/00* (2006.01)
*C22C 38/20* (2006.01)
*C22C 38/26* (2006.01)
*C22C 38/28* (2006.01)
*C22C 38/34* (2006.01)
*C22C 38/38* (2006.01)
*H01F 1/03* (2006.01)
*H02K 1/02* (2006.01)
*C21D 6/00* (2006.01)

(52) U.S. Cl.
CPC .............. *C21D 9/52* (2013.01); *B22D 11/001* (2013.01); *C21D 8/1205* (2013.01); *C21D 8/1222* (2013.01); *C21D 8/1233* (2013.01); *C21D 8/1261* (2013.01); *C21D 8/1266* (2013.01); *C21D 8/1272* (2013.01); *C22C 38/00* (2013.01); *C22C 38/001* (2013.01); *C22C 38/002* (2013.01); *C22C 38/004* (2013.01); *C22C 38/008* (2013.01); *C22C 38/02* (2013.01); *C22C 38/04* (2013.01); *C22C 38/06* (2013.01); *C22C 38/14* (2013.01); *C22C 38/20* (2013.01); *C22C 38/26* (2013.01); *C22C 38/28* (2013.01); *C22C 38/34* (2013.01); *C22C 38/38* (2013.01); *H01F 1/0306* (2013.01); *H02K 1/02* (2013.01); *C21D 6/008* (2013.01); *C21D 2201/05* (2013.01)

(58) Field of Classification Search
CPC ...... C21D 9/52; C21D 8/1222; C21D 8/1233; C21D 8/1266; C21D 8/1272; C22C 38/001
See application file for complete search history.

(56) References Cited

U.S. PATENT DOCUMENTS

| 676,412 A | 6/1901 | Bouchey |
| 2005/0067053 A1 | 3/2005 | Friedrich et al. |
| 2009/0202383 A1 | 8/2009 | Tanaka et al. |

FOREIGN PATENT DOCUMENTS

| CN | 1796015 A | 7/2006 |
| EP | 2602335 A1 | 6/2013 |
| JP | H08104923 A | 4/1996 |
| WO | 2013127048 A1 | 9/2013 |

OTHER PUBLICATIONS

Salih et al., "Magnetic properties and crystallographic textures of Fe 2.6 % Si after 90% cold rolling plus different annealing", Journal of Magnetism and Magnetic Materials, 2014, vol. 354, pp. 105-111.
International Search Report and Written Opinion for International Application No. PCT/IB2015/053323 ( dated Aug. 17, 2015) (11 Pages).

*Primary Examiner* — Jessee R Roe
(74) *Attorney, Agent, or Firm* — Lucas & Mercanti, LLP

(57) ABSTRACT

A process for the production of grain non-oriented electric Fe—Si steel strips, with excellent electric and/or magnetic characteristics to be used preferably for construction of electrical machines is disclosed.

11 Claims, No Drawings

US 10,337,080 B2

PROCESS FOR THE PRODUCTION OF GRAIN NON-ORIENTED ELECTRIC STEEL STRIP, WITH AN HIGH DEGREE OF COLD REDUCTION

CROSS-REFERENCE TO RELATED APPLICATIONS

This application is a 371 of PCT/IB2015/053323, filed May 7, 2015, which claims the benefit of Italian Patent Application No. RM2014A000231 filed May 8, 2014.

FIELD OF THE INVENTION

The present invention relates to a process for the production of grain non-oriented electric Fe—Si steel strips, with excellent electric and/or magnetic characteristics to be used preferably for construction of electrical machines.

BACKGROUND OF THE INVENTION

Grain non-oriented electric steel strips are used mainly in the manufacturing of cores of rotary electrical machines.

The products available on the market are classified on the basis of the magnetic properties thereof (defined by standard UNI EN 10106).

Such magnetic characteristics are associated to a crystalline structure of the components characterised by mean dimensions of the crystalline grain typically not greater than 0.25 mm and with a crystallographic weave as isotropic as possible in the plane of the rolled product to guarantee a magnetic behaviour that is similar for the various angles of application of the magnetic field during operation of electrical machines.

The main qualifying magnetic characteristics are the magnetic losses measured at specific induction working conditions and magnetisation frequency and the polarisation levels attainable at specific values of magnetic field applied in accordance with the IEC standard 60404-2 and IEC 60404-3. The existing technologies for manufacturing grain non-oriented electric steel strip are many and exploit, for reduction of the magnetic losses, some strategies, such as the reduction of the final thickness of the rolled products and/or the increase in electrical resistivity of the metal alloy by addition of elements such as Si, Al, Mn . . . , etc.

A further metallurgic characteristic exploited for improving the magnetic quality of the products is the maximum containment of the second non-metallic phases present in the metallic matrix of the steel, such as for example sulphides, nitrides, carbides and oxides. For this purpose the most modern production practices include manufacturing of steels having very low content of sulphur, nitrogen, carbon and oxygen already in the stage of solidification of the molten steel during slab casting.

A further controlled physical characteristic in rolled products is the surface quality of the sheets. In particular the best products are characterised by having surfaces having a low degree of roughness and free (or nearly free) from thermal oxidation.

Grain non-oriented electric steel strips, typically made of a Fe—Si alloy with a silicon content variable between 0.1% and 3.3% by weight, are manufactured starting from a molten alloy and solidified into slabs; the slabs are hot-rolled to obtain sheets of rolled product which are then subjected to cold-rolling up to the final application thickness.

With the exception of direct Strip-casting solidification, described for some time in the scientific and international patent literature but which does not at present include any reference industrial application, the slabs for manufacture of grain non-oriented strip are produced by continuous solidification at variable thicknesses, according to the technology used, in a range comprised between 20 mm and 300 mm.

Hot-rolling of the slabs is carried out in sometimes very different ways according to the technology and plant used but in any case in a temperature range comprised between 1300° C. and 700° C., for obtaining hot-rolled products having thicknesses variable between 2.5 mm and 1 mm.

Products for final use, typically offered on the market, are of a thickness that is variable between 1 mm and 0.35 mm for conventional applications and of lower thickness up to 0.2 mm for special and high frequency applications.

All the existing production processes are characterised by a reduction by hot-rolling (typically at temperatures >700° C.) to an amount comprised between 90-95% (thin-slab technology) and 98-99% (thick-slab technology) and by a reduction by cold-rolling (typically at temperatures <300° C.) to an amount generally comprised between 60% and 80%.

Then, in particular, in the most modern technologies, there is the tendency to produce hot-rolled sheets that are ever-thinner for reducing as far as possible the amount of cold-rolling applied. The claimed advantages are a reduction in cost and improvement of performance connected to a cold-rolling that is less expensive and at the same time an improvement of the magnetic quality associated to an improvement in the crystallographic weaves obtainable in the finished products.

U.S. Pat. No. 676,412 discloses a manufacturing method of grain non-oriented magnetic strip starting from hot-rolled sheets having a thickness of less than 1.5 mm. The method described in this document includes a silicon and aluminium content that is limited ([% S]+2[% Al]≤1.8) and even if it includes the possibility of adding further alloying elements such as P, Sn, Sb, Zr, V, Ti, N, Ni, Co, Nb, B up to an overall value of not greater than 1.5% the magnetic losses obtainable are therefore of poor quality with respect to the range of high-quality products required by today's market.

US 2005/0067053 A1 describes a process for hot-rolling manufacture of strip suitable for manufacture of grain non-oriented magnetic strip with a maximum hot-rolled strip thickness of 1.8 mm or 1.2 mm. The content of Si and Al that can be adopted is in this case higher but in any case limited to [% Si]+2[% Al]≤5%. In the document describing a specific crystalline structuring of the matrix of the hot-rolled product, there are no specific advantages in terms of high magnetic characteristics of the products that can be realised with such process.

The magnetic quality of the grain non-oriented strips, especially in relation to the use destination in electrical machines working at high frequency, is mainly regulated by the electrical resistivity of the alloy (content of elements such as Si, Al, Mn, . . . ), by the thickness of the strip and the polarisability of the material in the rotation plane of the magnetic field. Further, the mean size of the crystalline grains of the products must be regulated within specific very narrow dimensional ranges and optimised for the working frequency of the electrical machines to which they are destined.

In the industrial manufacturing of these products, however, there are important limitations to exploitation of said metallurgic levers for control of the quality, mainly in connection with practical factors, in particular:

an increase in the alloying elements increasing the electrical resistivity of the metal alloy leads to an increase in mechanical fragility up to critical levels wherein the reduction of the physical manufacturing performance makes the production processes no longer advantageous;

cold rolling to very slim thicknesses incurs high costs, especially when associated to the problems of fragility characteristic of the alloys under discussion;

it is difficult to guarantee control of the product microstructures (in terms of distribution of the grain size and crystalline structure) by which the characteristics of magnetic loss and magnetic polarisation are critically influenced, due to the high susceptibility of the microstructure to even small fluctuations in chemical composition of the alloys and the thermo-mechanical treatment conditions and final annealing.

DESCRIPTION OF THE INVENTION

The invention relates to a production process of grain non-oriented electric steel strips, wherein an overall reduction of thickness by cold rolling is obtained that is not less than 80%. The strips of the invention are preferably used for manufacturing ferromagnetic cores of electrical machines.

An object of the invention is therefore a process for the production of a grain non-oriented electric steel strip, wherein the steel comprises in percentage by weight:
Si 1.8%-6%
Al 0.2%-4%
Mn 0.2%-3%
S 0.0005%-0.01%
N 0.001%-0.01%
C 0.001%-0.01%
being Mn %/S %>100 and Al %/N %>200,
after casting and solidification in the form of a slab having a thickness Sp equal to or greater than 20 mm, is subjected to the following thermo-mechanical treatment:

optionally, heating of the slab at a temperature between 1000° C. and 1330° C., hot rolling of the slab to a temperature between 1300° C. and 700° C., with a total reduction rate between 70% and 99%, to obtain a hot rolled sheet (NAC) with thickness ranging between 2.5 mm and 12.0 mm, cold rolling of the previously hot-rolled sheet, with a total reduction rate of not less than 80% according to the following sequence:
a) a first step of cold rolling (LAF) with a reduction rate between 20% and 70%, at a temperature below 300° C.,
b) an intermediate annealing softening at a temperature between 700° C. and 1100° C. for a time between 10 s and 900 s,
c) at least a second step of cold rolling (LAF) with a reduction rate between 20% and 70%, wherein if said second step is repeated, it is preceded by an optional further intermediate annealing softening at a temperature between 700° C. and 1100° C. for a time between 10 s and 900 s, final annealing for recrystallization and grains' growth, in continuous, of the cold-rolled sheet at a temperature between 800° C. and 1200° C. for a time of between 10 s and 900 s.

In a further embodiment the steel further comprises: Sn 0.01%-0.15%, or more preferably also: Ti 0.001%-0.004%, Cu 0.01%-0.20%, Nb 0.001%-0.004%, Cr 0.02%-0.20%.

In a further preferred embodiment, one or more elements of the series Ti, V, Zr, Nb, Mo, Ta, W, Cr, Co, Ni, Cu are present in the steel such that the sum of their weight % is less than 1.5% and one or more elements of the series P, Sb, Sn, Pb, Bi, Se content in that the sum of their weigh % is less than 1.0%.

In an aspect of the invention, the process steps are such that:
a) the steps of cold rolling are unidirectional and are obtained by one or more rolling stands positioned in sequence, preferably by interposing between the laminating cylinders as lubricant an oil-in-water emulsion at a concentration in the range of 1-8% by volume,
b) the intermediate annealing softening after the cold rolling is carried out in continuous.

In a preferred embodiment of the process of the invention, the solidified steel in the form of slab has a thickness Sp<120 mm, the hot rolling of the strip (NAC) up to the final thickness is carried out in such a way that the rate of relative hot applied reduction (D_HOT; T>700° C.) and the relative cold applied deformation (D_COLD; T<300° C.) are such as to satisfy the following relationship:

$$D\_HOT*D\_COLD*>0.77$$

where
D_HOT=(sp slab−sp NAC)/sp slab
D_COLD=(sp NAC−sp LAF)/sp NAC.

After the last cold rolling the sheet more preferably has a final thickness between 0.15 and 0.50 mm.

In a preferred aspect the final in continuous recrystallization annealing and growth of crystal grains occurs in one or more annealing chambers at temperature between 850° C. and 1200° C. for a time between 5 sec and 90 sec.

In a further preferred aspect, the first cold rolling is conducted using work cylinders with a diameter between 150 mm and 350 mm, with a sheet temperature between 30 and 300° C. and applying a rolling strength to the sheet lower than 500 N/mm2.

A further object of the invention is a non-oriented grain electric steel strip obtainable according to the process described which has a thickness (sp) comprised between 0.15 mm and 1.0 mm, and magnetic losses measured at 1.5 Tesla and 50 Hz (P15) lower or equal to a result of the following relationship:

$$P15(w/kg)<[4,6*(sp)^2-1.6*(sp)+2].$$

The process of the invention allows to overcome the characteristic limitations of the manufacturing methods now in use with particular regard to the maximum levels of silicon and aluminium to be used in the produced alloys and to the strict and reliable control of the crystalline microstructure of the products for the production of grain non-oriented magnetic strips with excellent magnetic and mechanical characteristics.

The present invention proposes a manufacturing cycle based on a high degree of reduction to cold (>80%) of starting hot strips with greater thickness (2.5 mm-12 mm) with respect to the typical thicknesses used in the case of conventional industrial processes in use (generally <2.5 mm).

The treatment produces a very high quantity of reticular defects from cold deformation up to a critical limit density so that in the following annealing of the strips a very homogeneous process of recrystallisation of the structure of the rolled product is activated. The structure of the grain obtained after recrystallisation annealing facilitates the mechanical workability of the steels having higher silicon and aluminium content with respect to those conventionally produced: Si up to 6% and Al up to 4%. Further, during final annealing (which follows the final cold rolling steps), a more reliable result of the designed final microstructure is obtained (dimensions of the grain and weave); the evolution of the microstructure is less susceptible to fluctuations of the content of non-metallic inclusions and the thermal treatment conditions adopted, enabling the obtainement of the desired magnetic characteristics for the various grades of product with high performance and reproducibility.

The prior art including sub-dividing the entity of the overall cold deformation into a plurality of stages alternated with intermediate annealing, so as to improve the homogeneity of recrystallisation and the crystalline weave in view of an improvement of the magnetic characteristics, does not allow to obtain the results claimed in the present invention.

For this aim it is necessary to increase the thickness of the hot strip to beyond 2.5 mm and apply an overall cold reduction of greater than 80% without performing prior annealing of the hot strip.

The process is particularly effective in the case of technologies for which the overall reduction starting from the solidification format is limited (such as for example for thin slabs) and in particular enables production of magnetic strips having excellent qualitative characteristics and performance, superior to conventional methods.

A further object of the present invention is a specific variant of the process which enables a compaction of the production cycle and a reduction in production costs of the grain non-oriented strip, based on a hot treatment of the sheets having a large thickness which includes, in a continuous cycle, realising the following elementary process steps:

unwinding the sheet,
cold deforming using one or more rolling stands in-line;
annealing the cold-rolled sheet,
further cold rolling using one or more rolling stands in-line;
rewinding the sheet for sending on to the successive treatment steps.

The above-mentioned cold-rolling compacting and annealing enables considerable reductions in manufacturing costs up to making the proposed method more economical than those now in use and at the same time guaranteeing a very high product quality.

In the present invention specific process conditions have been identifiable, not known in the prior art, which enable obtaining products with excellent electrical and/or magnetic characteristics, guaranteeing a high degree of reliability of the final results and an excellent stability of the functional characteristics of the products and high production performance.

Up to this point a description of the invention has been given in general terms; now, with the aid of the following illustrative and non-limiting examples of the invention, a description will be given of embodiments thereof aimed at better describing aims, characteristics, advantages and application modes of the invention.

Example 1

Fe—Si alloy was produced with a silicon content of 3.9%, aluminium of 1.1%, manganese of 1.2%, sulphur of 0.002%, nitrogen of 0.005% and carbon of 0.003%. The steel was cast in slabs having a thickness of 50 mm directly hot-rolled to a thickness of 6.0 mm for a reduction in thickness of 88%. The starting temperature of rolling of the slabs was controlled in the range of 1160-1140° C. while the end-rolling temperature was in the range of 900-860° C. The hot-rolled products were then cold-rolled up to the thickness of 2.7 mm with a reduction rate of the first cold-rolling of 55% and annealed continuously at a temperature of 750° C. for 30 seconds and air-cooled. The rolled products thus obtained were then sanded, pickled and cold-rolled up to a thickness of 0.50 mm, with a reduction rate of the second cold rolling of greater than 81% and a total cold reduction rate of greater that 91%, subsequently annealed in a dry nitrogen-hydrogen atmosphere at the temperature of 1020° C. for 60 seconds.

The strips thus obtained were then characterised by magnetic measurement according to the UNI EC 10106 standard. All the rolled products measured satisfied the following magnetic characteristics:

B5000 (magnetic polarization)≥1.65 Tesla

P10 (magnetic losses at the induction of 1.0 Tesla and 50 Hz)≥0.75 W/Kg

P15 (magnetic losses at the induction of 1.5 Tesla and 50 Hz)≥1.78 W/Kg

Example 2

Four steels having different composition were prepared, as shown in Table 1. Some experimental slabs having a thickness of 40 mm were produced therefrom.

The slabs were then hot-rolled using the following procedure: heating up to a temperature of 1200° C. and maintenance for 15 minutes, then hot-rolling to thickness of 5.0 mm, with a reduction rate of 87.5%.

TABLE 1

| Steel | Si % | Al % | C % | N % | S % | Mn % | Sn % | Ti % |
|---|---|---|---|---|---|---|---|---|
| A | 1.80 | 0.90 | 0.002 | 0.002 | 0.001 | 0.52 | 0.10 | 0.001 |
| B | 2.80 | 1.20 | 0.002 | 0.002 | 0.001 | 0.50 | 0.12 | 0.002 |
| C | 3.50 | 2.00 | 0.003 | 0.004 | 0.001 | 0.48 | 0.09 | 0.001 |
| D | 4.00 | 1.50 | 0.002 | 0.003 | 0.002 | 0.50 | 0.09 | 0.002 |

The hot-rolled products were then cold-rolled up to the thickness of 2.5 mm using, as lubricant, a 5% water-oil emulsion, annealed continuously at a temperature of 950° C. for 20 seconds and air-cooled. The rolled products thus obtained were then sanded, pickled and cold-rolled up to a thickness of 0.50, with an overall cold reduction rate of 90%, subsequently annealed in a dry nitrogen-hydrogen atmosphere at a temperature of 1000° C. for 40 seconds. Table 2 shows the magnetic characteristics measured on samples of the four different experimental steels treated according to the specifications of the invention. B5000 is the induction measured in Tesla in an applied field of 5000 A/m, P10 and P15 are the magnetic losses measured in Watt per Kg on induction of work respectively of 1.0 and 1.5 Tesla and 50 Hz.

TABLE 2

| Steel | B5000 TESLA | P10 W/Kg | P15 W/Kg |
|---|---|---|---|
| A | 1.72 | 1.23 | 2.95 |
| B | 1.69 | 0.90 | 2.25 |
| C | 1.67 | 0.76 | 1.84 |
| D | 1.65 | 0.69 | 1.71 |

Example 3

A steel containing, by weight, silicon 3.8%, carbon 0.004%, manganese 2.1%, copper 0.01%, aluminium 1.2%, sulphur 0.006%, nitrogen 0.005%, titanium 0.002%, niobium 0.001%, tin 0.09%, chromium 0.02%, was solidified in slabs having a thickness of 70 mm and a series of pieces produced was heated at a temperature of 1150° C. for a time of about 20 minutes and cold-rolled to variable thicknesses (NAC thickness); thereafter they were cold-rolled with a reversible roller using as lubricant a water-oil emulsion at 3%, as in Table 3, where the thickness values after the first step of cold-rolling actuated in the single tests (1$^{st}$ LAF thickness) are reported. All of rolled products were then subjected to annealing at 980° C. for 60 seconds in dry nitrogen atmosphere. The annealed products were then subjected to a second cold-rolling stage up to a variable final thickness (final thickness).

TABLE 3

| Assay N | NAC thickness mm | D_HOT fraction | 1$^{st}$ LAF thickness mm | Final thickness mm | D_COLD fraction | B5000 Tesla | P10 W/Kg | P15 W/Kg | Cycle type | H*C |
|---|---|---|---|---|---|---|---|---|---|---|
| 1 | 1.8 | 0.97 | 1.0 | 0.50 | 0.72 | 1.63 | 1.21 | 3.05 | | 0.70 |
| 2 | 2.0 | 0.97 | 1.0 | 0.35 | 0.83 | 1.60 | 1.14 | 2.70 | | 0.80 |
| 3 | 2.3 | 0.97 | 1.5 | 0.65 | 0.72 | 1.64 | 1.45 | 3.48 | | 0.69 |
| 4 | 2.3 | 0.97 | 1.5 | 0.50 | 0.78 | 1.63 | 1.03 | 2.52 | | 0.76 |
| 5 | 2.4 | 0.97 | 1.5 | 0.50 | 0.79 | 1.64 | 1.05 | 2.60 | | 0.76 |
| 6 | 2.6 | 0.96 | 1.5 | 0.65 | 0.75 | 1.63 | 1.50 | 3.60 | | 0.72 |
| 7 | 2.6 | 0.96 | 1.5 | 0.50 | 0.81 | 1.65 | 0.70 | 1.73 | inv | 0.78 |
| 8 | 2.8 | 0.96 | 1.0 | 0.35 | 0.88 | 1.67 | 0.65 | 1.58 | inv | 0.84 |
| 9 | 3.5 | 0.95 | 1.2 | 0.20 | 0.94 | 1.67 | 0.60 | 1.45 | inv | 0.90 |
| 10 | 4.0 | 0.94 | 1.5 | 0.35 | 0.91 | 1.66 | 0.63 | 1.55 | inv | 0.86 |
| 11 | 4.0 | 0.94 | 1.5 | 0.50 | 0.88 | 1.65 | 0.69 | 1.71 | inv | 0.83 |
| 12 | 5.0 | 0.93 | 2.0 | 0.50 | 0.90 | 1.66 | 0.66 | 1.69 | inv | 0.84 |
| 13 | 6.0 | 0.91 | 2.0 | 0.50 | 0.92 | 1.65 | 0.69 | 1.72 | inv | 0.84 |
| 14 | 8.0 | 0.89 | 2.5 | 0.65 | 0.92 | 1.64 | 0.92 | 2.32 | inv | 0.81 |
| 15 | 10.0 | 0.86 | 3.0 | 0.65 | 0.94 | 1.64 | 0.90 | 2.29 | inv | 0.80 |

In table 3 the column denoted by D_HOT represents the hot reduction rate expressed as D_HOT=(thickness of slab−thickness of NAC)/thickness of slab, column D_COLD indicates the total reduction amount applied expressed as D_COLD=(thickness NAC−final thickness LAF)/thickness NAC and the column indicated by H*C relates to the product H*C=D_HOT*D_COLD. In the cycle column, inv=according to the invention.

The various rolled products to final thickness have undergone an annealing process in dry hydrogen.

All the rolled products of the experiment were then sampled and subjected to magnetic characterisation. The results obtained are reported in Table 3. It can be observed than by applying the teachings of the invention (inv) it is possible to obtain products having excellent magnetic characteristics, superior to those of cases not treated in the ways taught by the invention.

Example 4

Four steels having different composition were prepared, as shown in Table 4. Some experimental slabs having a thickness of 200 mm were produced therefrom.

The slabs were hot-rolled using the following procedure: heating up to the temperature of 1250° C. and maintenance for 20 minutes, then hot-rolling to a thickness of 4.0 mm, with a reduction of 98%.

TABLE 4

| Steel | Si % | Al % | C % | N % | S % | Mn % | Sn % | Mn/S | Al/N |
|---|---|---|---|---|---|---|---|---|---|
| A | 3.80 | 0.42 | 0.002 | 0.005 | 0.009 | 0.52 | 0.07 | 58 | 84 |
| B | 3.20 | 0.50 | 0.003 | 0.002 | 0.008 | 0.50 | 0.09 | 63 | 250 |
| C | 3.80 | 0.80 | 0.003 | 0.006 | 0.002 | 0.48 | 0.01 | 240 | 133 |
| D | 3.90 | 0.50 | 0.003 | 0.002 | 0.001 | 0.50 | 0.08 | 500 | 250 |

The rolled strips as produced were then cold-rolled to a thickness of 2 mm, annealed for 60 seconds at the temperature of 900° C. in a nitrogen atmosphere, then cold-rolled to the thickness of 0.50 mm and lastly annealed for 20 seconds at a temperature of 1040° C. in dry hydrogen. A magnetic characterisation of the sheets thus-processed was then carried out and the results are reported in Table 5.

TABLE 5

| Steel | B5000 TESLA | P10 W/Kg | P15 W/Kg | Cycle type |
|---|---|---|---|---|
| A | 1.61 | 1.49 | 3.46 | |
| B | 1.65 | 1.34 | 3.10 | |
| C | 1.63 | 0.80 | 1.98 | inv |
| D | 1.64 | 0.82 | 2.05 | inv |

The invention claimed is:

1. A process for the production of a grain non-oriented electric steel strip, wherein the steel comprises by weight:
Si 1.8%-6%
Al 0.2%-4%
Mn 0.2%-3%
S 0.0005%-0.01%
N 0.001%-0.01%
C 0.001%-0.01%
being Mn %/S %>100 and Al %/N %>200,
and, after casting and solidification in the form of a slab having a thickness Sp equal to or greater than 20 mm, is subjected to the following thermo-mechanical treatment:
optionally, heating of the slab at a temperature between 1000° C. and 1330° C.,
hot rolling of the slab to a temperature between 1300° C. and 700° C., with a total reduction rate between 70% and 99%, to obtain a hot rolled sheet (NAC) with thickness ranging between 2.5 mm and 12.0 mm, cold rolling of the previously hot-rolled sheet, with a total reduction rate of not less than 80% according to the following sequence:
a) a first step of cold rolling (LAF) with a reduction rate between 20% and 70%, at a temperature below 300° C.;
b) an intermediate annealing softening at a temperature between 700° C. and 1100° C. for a time between 10 s and 900 s; and
c) a second step of cold rolling (LAF) with a reduction rate between 20% and 70%, wherein if said second step is repeated, it is preceded by an optional further intermediate annealing softening at a temperature between 700° C. and 1100° C. for a time between 10 [s] seconds and 900 [s] seconds,
final annealing for recrystallization and grains' growth, in continuous, of the cold-rolled sheet at a temperature between 800° C. and 1200° C. for a time of between 10 [s] seconds and 900 [s] seconds.

2. The process according to claim 1 wherein, wherein the steel further comprises by weight:
Sn 0:01%-0:15%.

3. The process according to claim 2 wherein, wherein the steel further comprises by weight:
Ti 0.001%-0.004%
Cu 0:01%-0:20%
Nb 0.001%-0.004%
Cr 0.02%-0:20%.

4. The process according to claim 3 wherein one or more elements of the series Ti, V, Zr, Nb, Mo, Ta, W, Cr, Co, Ni, Cu are present in the steel the content being such that the sum of their % by weight is less than 1.5% and one or more elements of the series P, Sb, Sn, Pb, Bi, Se are present in the steel the content being such that the sum of their % by weight is less than 1.0%.

5. The process according to claim 1, in which:
a) the steps of cold rolling are unidirectional and are obtained by one or more rolling stands positioned in sequence; and
b) the intermediate annealing softening after the cold rolling is carried out in continuous.

6. The process according to claim 5, wherein the rolling stands are positioned in sequence by interposing between the laminating cylinders an oil-in-water emulsion lubricant at a concentration in the range of 1-8% by volume.

7. The process according to claim 1, wherein the solidified steel in the form of slab has a thickness Sp<120 mm, the hot rolling of the strip (NAC) up to the final thickness is carried out in such a way that the rate of relative hot reduction (D_HOT; T>700° C.) and the relative cold applied deformation (D_COLD; T<300° C.) are such as to satisfy the following relationship:

$$D\_HOT\, D\_COLD^* > 0.77$$

where
D_HOT=(sp slab−sp NAC)/sp slab
D_COLD=(sp NAC−sp LAF)/sp NAC.

8. The process according to claim 1 wherein the sheet after the last cold rolling has a final thickness between 0.15 and 0.50 mm.

9. The process according to claim 1, wherein the final in continuous recrystallization annealing and growth of crystal grains occurs in one or more annealing chambers at temperature between 850° C. and 1200° C. for a time between 5 seconds and 90 seconds.

10. The process according to claim 1 wherein the first cold rolling is conducted using work cylinder with a diameter between 150 mm and 350 mm, with a sheet temperature between 30 and 300° C. and applying a rolling strength to the sheet lower than 500 N/mm².

11. A non-oriented grain electric steel strip obtainable according to claim 1 it has a thickness (sp) between 0.15 mm and 1.0 mm, and magnetic losses measured at 1.5 Tesla and 50 Hz (P15) lower or equal to the result of the following relationship: P15 (w/kg)<[4,6*(sp)^2−1.6*(sp)+2].

* * * * *